(12) United States Patent
Mitta

(10) Patent No.: US 11,787,725 B2
(45) Date of Patent: Oct. 17, 2023

(54) MANUFACTURING METHOD FOR GLASS PARTICULATE DEPOSIT AND BURNER

(71) Applicant: Shin-Etsu Chemical Co., Ltd., Tokyo (JP)

(72) Inventor: Ryo Mitta, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 161 days.

(21) Appl. No.: 17/009,793

(22) Filed: Sep. 2, 2020

(65) Prior Publication Data

US 2021/0061701 A1 Mar. 4, 2021

(30) Foreign Application Priority Data

Sep. 3, 2019 (JP) ................................ 2019-160530

(51) Int. Cl.
*C03B 37/014* (2006.01)

(52) U.S. Cl.
CPC ...... *C03B 37/0142* (2013.01); *C03B 2207/06* (2013.01); *C03B 2207/42* (2013.01)

(58) Field of Classification Search
None
See application file for complete search history.

(56) References Cited

U.S. PATENT DOCUMENTS

| 10,501,362 | B2 | 12/2019 | Otosaka |
| 2017/0096363 | A1 | 4/2017 | Kojima |
| 2019/0292087 | A1* | 9/2019 | Urata ................ C03B 37/012 |

FOREIGN PATENT DOCUMENTS

| JP | S6381828 | U | 5/1988 | |
| JP | S63110535 | U | 7/1988 | |
| JP | 2003128428 | A * | 5/2003 | ......... C03B 37/0142 |
| JP | 2006199527 | A | 8/2006 | |
| JP | 2010096378 | A | 4/2010 | |
| JP | 2014009142 | A * | 1/2014 | |
| JP | 2017071513 | A | 4/2017 | |
| JP | 6505188 | B1 | 4/2019 | |

\* cited by examiner

*Primary Examiner* — Queenie S Dehghan

(57) ABSTRACT

Provided is a glass particulate deposit manufacturing method for manufacturing a glass particulate deposit comprising mounting a fixing jig on an outer periphery of an outermost pipe of a burner; inserting a burner cover from a tip end of the outermost pipe of the burner; and sandwiching and compressing a part of the fixing jig between the burner cover and the outermost pipe of the burner to fix the burner cover to the burner, wherein an outer diameter of a part of the fixing jig that is not compressed is greater than an inner diameter of a part of the burner cover inserted to the tip end of the outermost pipe of the burner.

5 Claims, 6 Drawing Sheets

MANUFACTURING METHOD FOR GLASS PARTICULATE DEPOSIT AND BURNER

The contents of the following Japanese patent application are incorporated herein by reference:
2019-160530 filed in JP on Sep. 3, 2019

BACKGROUND

1. Technical Field

The present invention relates to a manufacturing method for a glass particulate deposit of depositing glass particulates on a starting rod to manufacture a glass particulate deposit by an OVD method (Outside vapor deposition method), a VAD method (Vapor phase axial deposition method), an MMD method (Multi burner multiple deposition method) and the like, and a burner.

2. Related Art

In the related art, in a manufacturing apparatus for an optical fiber base material by a generally known OVD method, a starting rod and a burner for generating glass particulates are mounted in a reaction vessel, a raw material gas such as $SiCl_4$ is supplied to the burner, and glass particulates formed as a result of a flame hydrolysis reaction in flame formed by the burner are deposited around the starting rod to form a glass particulate deposit.

In the manufacturing method for a glass particulate deposit, in order to prevent attachment of the glass particulates to a tip end of the burner made of quartz glass and a shape change due to deterioration of the tip end of the burner and to control flow of burner flame, the tip end of the burner is covered with a detachable burner cover (burner hood) (refer to Patent Documents 1, 2, 3 and 4). Also, technology of changing a position and an angle of the burner as the glass particulate deposit grows is known (refer to Patent Documents 5 and 6).

CITATION LIST

Patent Document

Patent Document 1: Japanese Utility Model Application Publication No. Sho63-110535
Patent Document 2: Japanese Utility Model Application Publication No. Sho63-81828
Patent Document 3: Japanese Patent Application Publication No. 2010-96378
Patent Document 4: Japanese Patent Application Publication No. 2006-199527
Patent Document 5: Japanese Patent Application Publication No. 2017-071513
Patent Document 6: Japanese Patent No. 6,505,188

SUMMARY

Technical Problem

In many cases, the burner and the burner cover are made of quartz glass having excellent heat resistance and corrosion resistance. In many cases, the burner made of quartz glass is manufactured by manually welding circular pipes made of quartz glass, and the circular pipes made of quartz glass are also manufactured while adjusting inner and outer diameters by heating and stretching. Therefore, a shape difference is likely to occur between the individual burners. For this reason, even though the burner is covered with the burner cover, the position of the burner cover cannot be often reproduced. Specifically, the burner cover is not fixed at a predetermined position of the burner, so that the burner cover is inserted too deeply into the burner, or, on the contrary, is inserted only to the front of the burner. For this reason, a state of the burner flame is different between the individual burners, so that a shape difference in the glass particulate deposit is likely to occur. Also, while manufacturing the glass particulate deposit, when changing the position and angle of the burner (refer to Patent Documents 5 and 6, and the like), the burner cover deviates from the predetermined position.

According to the burner disclosed in Patent Document 1, the burner cover is fixed to the burner by a fixing material such as Teflon (Registered Trademark) tape. However, the fixing material cannot support the burner cover, and while repeatedly manufacturing the glass particulate deposit, the position of the burner cover deviates, so that it is difficult to reproduce the flame state.

According to the burner disclosed in Patent Document 2, a heat resistant tape is wrapped on the outermost pipe of the burner so as to be the same diameter as an inner diameter of the burner cover, and the burner cover is mounted on the tape and is fixed to the burner by wrapping a fixing tape material so as to cover a base of the mounted burner cover and an exposed part of the heat resistant tape wrapped on the burner. However, since the burner cover is securely fixed by the fixing tape material, it is not possible to detach the burner cover from the burner for replacement. Therefore, for cleaning the burner cover, it is necessary to detach the burner itself from the device for replacement.

According to the burner disclosed in Patent Document 3, a tip end of the burner is provided with a joint made of heat resistant resin so as to couple a nozzle. However, it is difficult to set the joint between the burner having a large individual difference and the nozzle. Also, the complex joint is heavy and expensive, which leads to instability of the burner and increases the cost.

According to the burner disclosed in Patent Document 4, the tip end of the burner is mounted with a dual cover, which doubles the cost of the cover, complicates a mounting method, makes the tip end of the burner heavy to lead to instability of the burner and increases the cost.

The present invention has been made in view of the above situations, and an object thereof is to provide a manufacturing method for a glass particulate deposit capable of easily fixing a burner having a large individual difference and a burner cover at predetermined positions of the burner, not causing positional deviation due to movement of the burner during the manufacturing and easily attaching and detaching the burner cover.

Solving Means

In order to solve the above problems, a first aspect of the present invention provides a manufacturing method for a glass particulate deposit comprising mounting a starting rod and a burner in a reaction vessel; introducing a glass raw material to the burner; subjecting the glass raw material to a flame hydrolysis reaction to generate glass particulates in flame formed by the burner; and depositing the generated glass particulates on the starting rod to manufacture a glass particulate deposit, wherein the manufacturing method comprises mounting a fixing jig on an outer periphery of an outermost pipe of the burner; inserting a burner cover from a tip end of the outermost pipe of the burner; and sandwiching and compressing a part of the fixing jig between the burner cover and the outermost pipe of the burner to fix the burner cover to the burner, and an outer diameter of a part of the fixing jig that is not compressed is greater than an inner diameter of a part of the burner cover inserted to the tip end of the outermost pipe of the burner.

Note that, the fixing jig preferably contains at least one of PTFE, PFA, and polyimide, and the fixing jig may be mounted on the outer periphery of the outermost pipe of the burner by wrapping a tape or a film. Also, an inner/outer diameter difference between an inner diameter of the burner cover and an outer diameter of the outermost pipe of the burner in a section orthogonal to a longitudinal direction of the burner at the time when the burner cover is fixed to the burner is preferably equal to or greater than 0.5 mm and equal to or smaller than 4 mm, and a protruding distance of a tip end of the burner cover from a tip end of the burner is preferably equal to or greater than 20 mm and equal to or smaller than 40 mm.

Another aspect of the present invention provides a burner comprising a multi-pipe burner; a burner cover; and a fixing jig mounted on an outer periphery of an outermost pipe of the multi-pipe burner, a part of the fixing jig being sandwiched and compressed between the burner cover and the multi-pipe burner to fix the burner cover to the multi-pipe burner, wherein an outer diameter of a part of the fixing jig that is not compressed is greater than an inner diameter of a part of the burner cover.

DESCRIPTION OF EXEMPLARY EMBODIMENTS

Figure 1A:
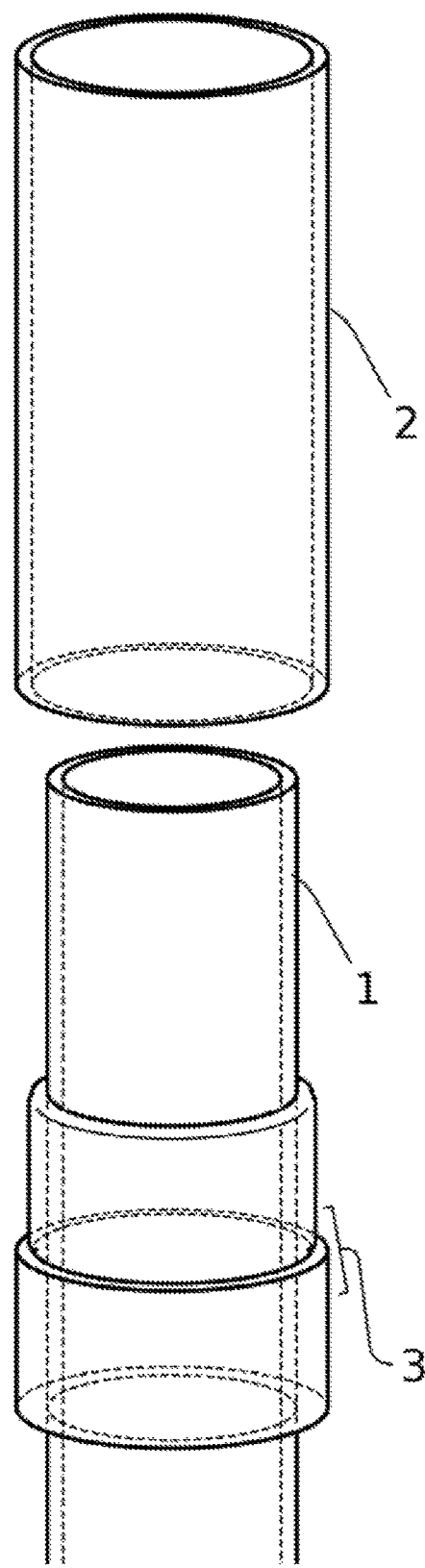
FIG. 1A is a schematic view showing an aspect where a burner cover is mounted to a burner via a fixing jig in accordance with one embodiment, showing a state before the burner cover is attached.
Figure 1B:
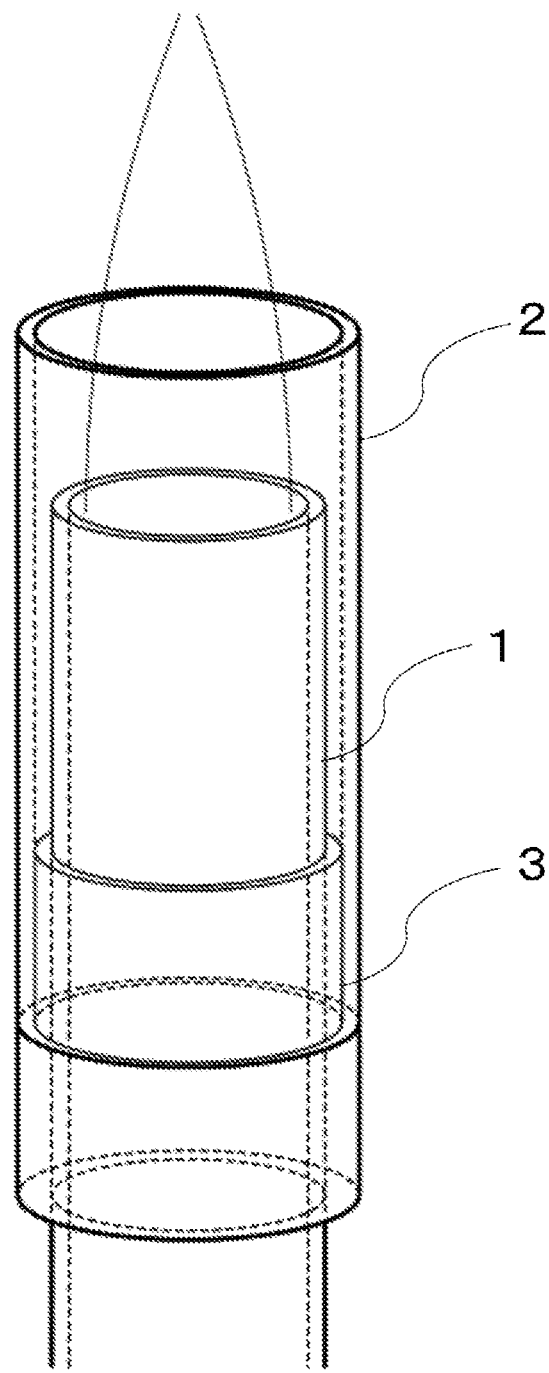
FIG. 1B is a schematic view showing an aspect where the burner cover is mounted to the burner via the fixing jig in accordance with one embodiment, showing a state after the burner cover is attached.

Hereinafter, embodiments of a manufacturing method for a glass particulate deposit will be described with reference to the accompanying drawings. Note that, the present invention is not limited by the following embodiments. FIGS. 1A and 1B are configuration views of a burner for manufacturing a glass particulate deposit of the present embodiment, where FIG. 1A shows a state before a burner cover is attached to the burner and FIG. 1B shows a state after the burner cover is attached. A multi-pipe burner 1 has a fixing jig 3 mounted on an outermost pipe thereof, and a burner cover 2 is fixed to the burner 1 via the fixing jig 3. Although not shown herein, pipes for supplying a glass raw material gas such as gaseous $SiCl_4$, a gas for flame formation such as $H_2$ and $O_2$, and a burner seal gas such as an inert gas of $N_2$ and Ar are accommodated inside of the multi-pipe burner 1.

The glass raw material introduced into the burner generates glass particulates by a flame hydrolysis reaction in flame formed by the burner, and the generated glass particulates are deposited on a starting rod to manufacture a glass particulate deposit. In this case, in order to prevent attachment of the glass particulates to a tip end of the burner and a shape change due to deterioration of the tip end of the burner and to control flow of burner flame, the tip end of the burner is covered with a burner cover.

However, in particular, the burner and the burner cover made of quartz glass have complex structures, are difficult to manufacture, and are often manufactured manually one by one, so that individual differences in shape are large in many cases. For this reason, the burner cover is fixed to a predetermined position of the burner, which makes it difficult to attach and detach the burner cover for replacement. If an outer diameter difference between the burner and the burner cover is large, a protruding distance of the burner cover from the tip end of the burner is different depending on the burners, for example, which affects flow of the formed flame and a deposited state of the glass particulates. This in turn leads to deterioration in shape and deposition efficiency of the glass particulate deposit. Also, the burner cover is shaken during deposition of the glass particulate deposit, which adversely affects the flow of the flame and leads to breakage. In particular, the influence is likely to show when manufacturing the glass particulate deposit by changing an angle of the burner or moving a position of the burner during the deposition.

In order to solve the above problems, the present embodiment is characterized in that the fixing jig 3 for fixing the burner cover 2 to the burner 1 is mounted on an outer periphery of an outermost pipe of the burner 1, and the burner cover 2 is mounted to a tip end of the burner 1 via the fixing jig, as shown in FIG. 1A and FIG. 1B, and a part of the fixing jig is compressed with being sandwiched between the burner cover 2 and the outermost pipe of the burner 1 to fix the burner cover 2 to the burner 1, and an outer diameter of a part of the fixing jig that is not compressed is greater than an inner diameter of a lower part of the burner cover 2. Thereby, the burner cover 2 is securely fixed to a predetermined position of the burner 1 all the time.

A material of the fixing jig 3 is not particularly limited. For example, a solid material or a viscous gel-like material is possible. However, a material that is not easily affected by heat from flame ejected from the burner and a reaction gas is preferable. For example, NITOFLON tape (manufactured by Nitto Denko Corporation; a product name) and VALQUA Tape Seal #20 (manufactured by VALQUA, LTD.; a product name) may be exemplified. The fixing jig 3 is preferably a tape or a film containing polyimide, PFA (fluorine resin) and PTFE (Teflon resin) having excellent heat resistance and chemical resistance, and a favorable effect is obtained by wrapping the fixing jig on the outer periphery of the outermost pipe of the burner 1. Note that, the VALQUA Tape Seal contains PTFE (Teflon resin) and the like, so that it is characterized by excellent heat resistance and chemical resistance, can be easily processed, is extendible and inexpensive, and is favorably used in the present embodiment.

Figure 2A:
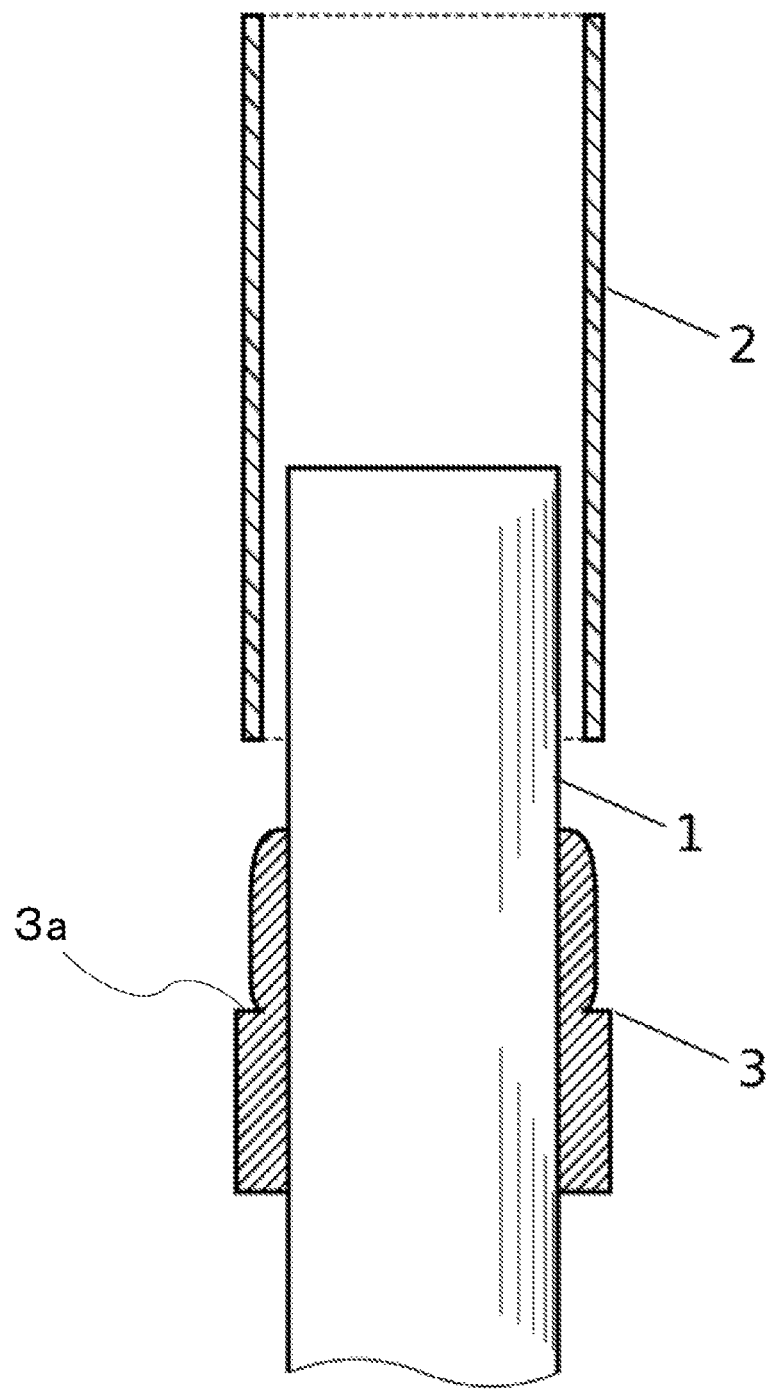
FIG. 2A is a schematic view showing an aspect where the burner cover is mounted to the burner via a compressible fixing jig in accordance with one embodiment, showing a state before the burner cover is attached.
Figure 2B:
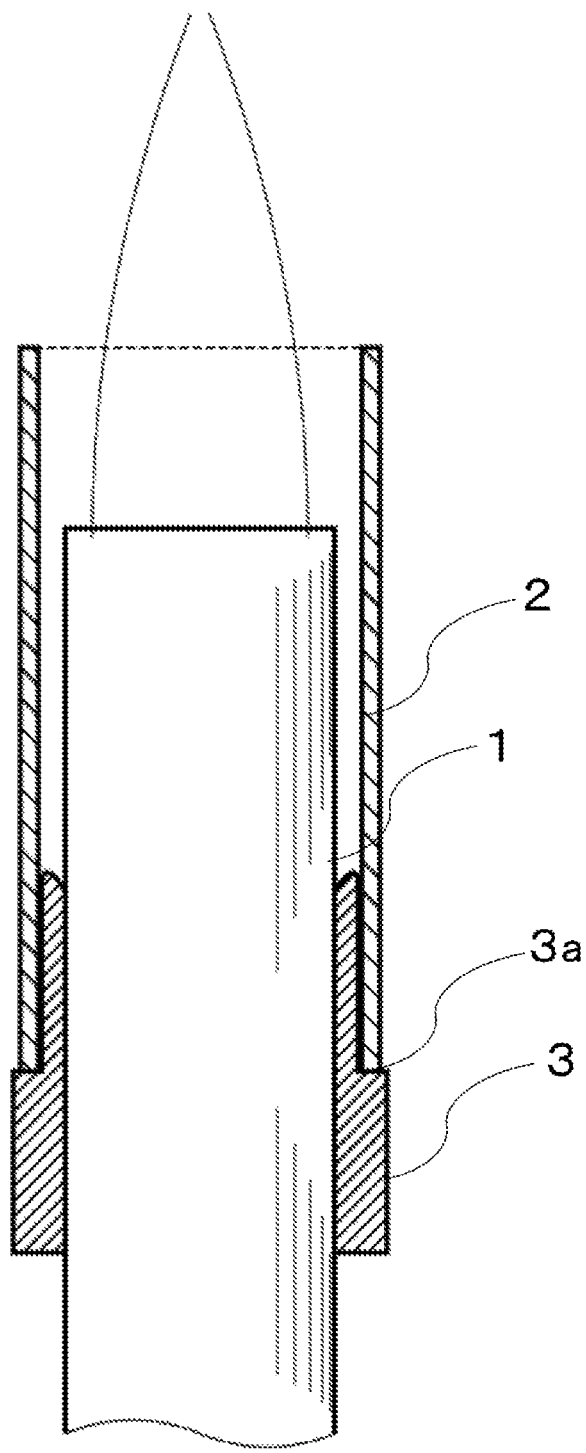
FIG. 2B is a schematic view showing an aspect where the burner cover is mounted to the burner via the compressible fixing jig in accordance with one embodiment, showing a state after the burner cover is attached.

The burner cover 2 is designed to have an inner diameter greater than an outer diameter of the outermost pipe of the burner 1 so as not to be affected by shape differences of the burner 1 and the burner cover 2 for each solid. As shown in FIG. 2A and FIG. 2B, the tape or film as the fixing jig 3 is wrapped at a place on the outer periphery of the outermost pipe of the burner 1, at which the burner cover is to be mounted, and the burner cover 2 is inserted and sandwiches the wrapped tape between the outermost pipe of the burner 1 and the burner cover and the burner cover 2 is mounted so as to be compressed by a squashing allowance of the tape, so that the burner cover 2 can be easily fixed at a predetermined position.

At this time, when the burner cover 2 is slowly twistingly pushed into the fixing jig by a hand, the burner cover can be mounted while squashing and compressing the fixing jig having an outer diameter greater than an inner diameter of a lower end of the burner cover 2. At this time, since the burner cover 2 is fixed to the outermost pipe of the burner 1 via the fixing jig and the burner cover 2 is not thus in direct contact with the burner 1, even though there are shape differences of the burner 1 and the burner cover 2, it is difficult to affect the fixed state. Additionally, the burner cover 2 is fixed to the burner 1 mainly by a restoring force by which a compressed part of the fixing jig intends to restore diametrically outward. Also, even though there is a difference between the inner diameter of the burner cover 2 and the outer diameter of the outermost pipe of the burner 1, the difference can be easily adjusted on the spot by changing the number of wrapping times of the tape serving as the fixing jig. Also, there is an advantage that it is not necessary to prepare a dedicated fixing jig, it is easy to perform maintenance such as replacement, and it is not also necessary to perform fine processing for the burner 1 and the burner cover 2 themselves. Also, the fixing jig 3 is mounted so that an outer diameter of a part of the fixing jig 3 not compressed is greater than an outer diameter of an outermost pipe of a lower end of the burner cover 2. Thereby, the burner cover 2 can be fixed to a predetermined position and the burner cover 2 can be prevented from deviating and falling down due to vibrations and the like while repeating the manufacturing, so that it is possible to secure stability of the flame even though the burner is continuously used.

The fixing jig 3 may also be a stretchable resin molded product previously molded into a cylindrical shape, rather than the tape or film. Also in this case, the fixing jig 3 is stretchable, so that the fixing jig 3 can be mounted by being spread and fitted on the outer periphery of the outermost pipe of the burner 1.

An outer diameter of on the tip end-side of the burner 1 in the fixing jig 3 is preferably smaller than an outer diameter on an opposite side to the tip end. In the forms shown in FIG. 1A and FIG. 1B and FIG. 2A and FIG. 2B, a step 3a is provided between the fixing jigs. By pushing the burner cover 2 until an end face of the burner cover opposite to the burner 1 is brought into contact with the step 3a, it is possible to fix the burner cover 2 to a predetermined position in a longitudinal direction. In other words, the step 3a serves as an abutting part.

Instead of providing the step, the fixing jig may be formed to have a tapered shape, for example. In this case, the fixing jig 3 may have such a shape that the outer diameter gradually increases in the longitudinal direction from the tip end-side of the burner 1.

Instead, a main body part of the fixing jig 3 may be formed to have an outer diameter that is constant in the longitudinal direction, i.e., to have a cylindrical shape, and a protrusion protruding diametrically from the main body part beyond the inner diameter of the burner cover 2 may be provided. Also in this case, by pushing the burner cover 2 until it is brought into contact with the protrusion, it is possible to fix the burner cover 2 to a predetermined position in the longitudinal direction. In other words, the protrusion serves as an abutting part.

EXAMPLE

Figure 3:
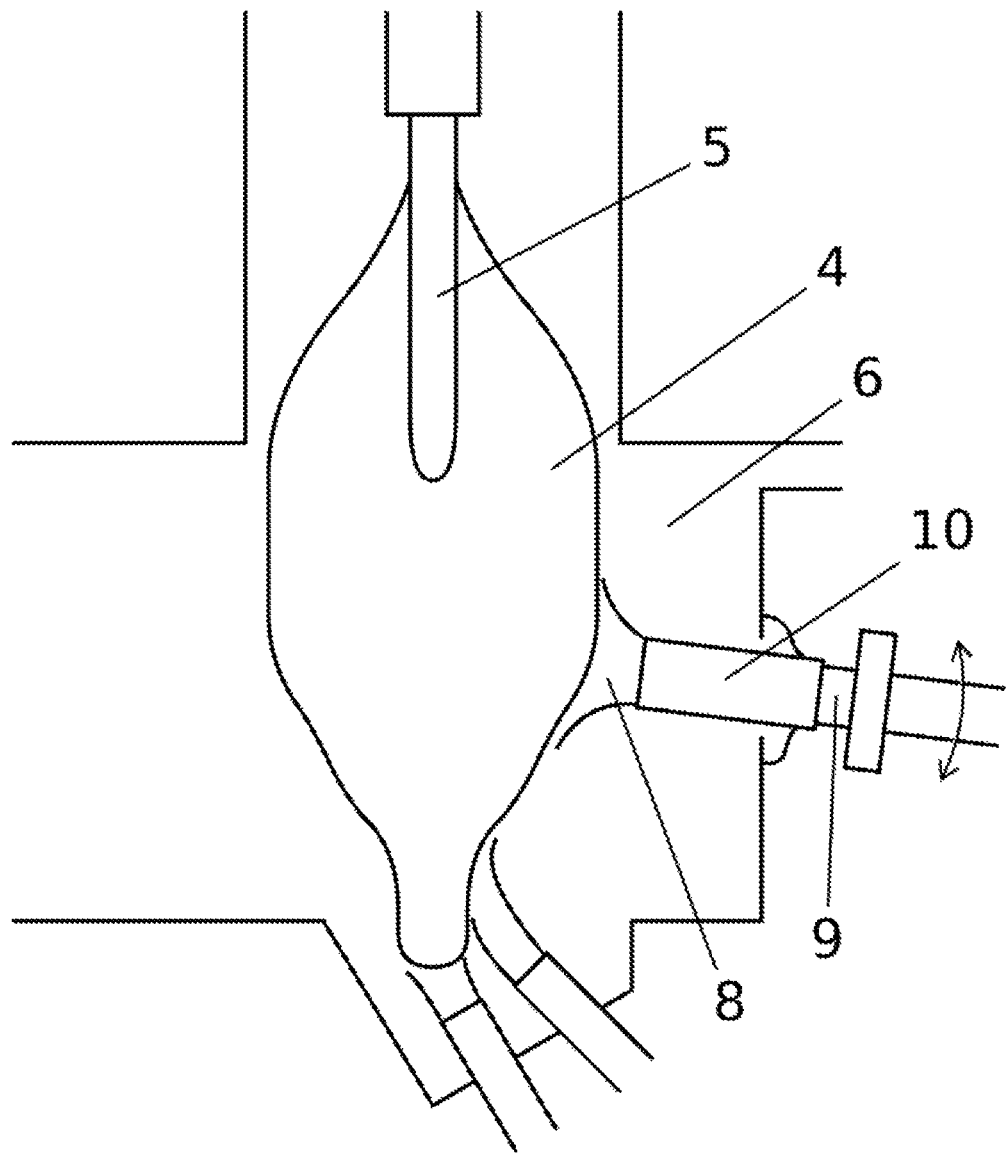
FIG. 3 is a schematic configuration view showing a manufacturing apparatus for a glass particulate deposit accompanied by a change in angle of the burner.
Figure 4:
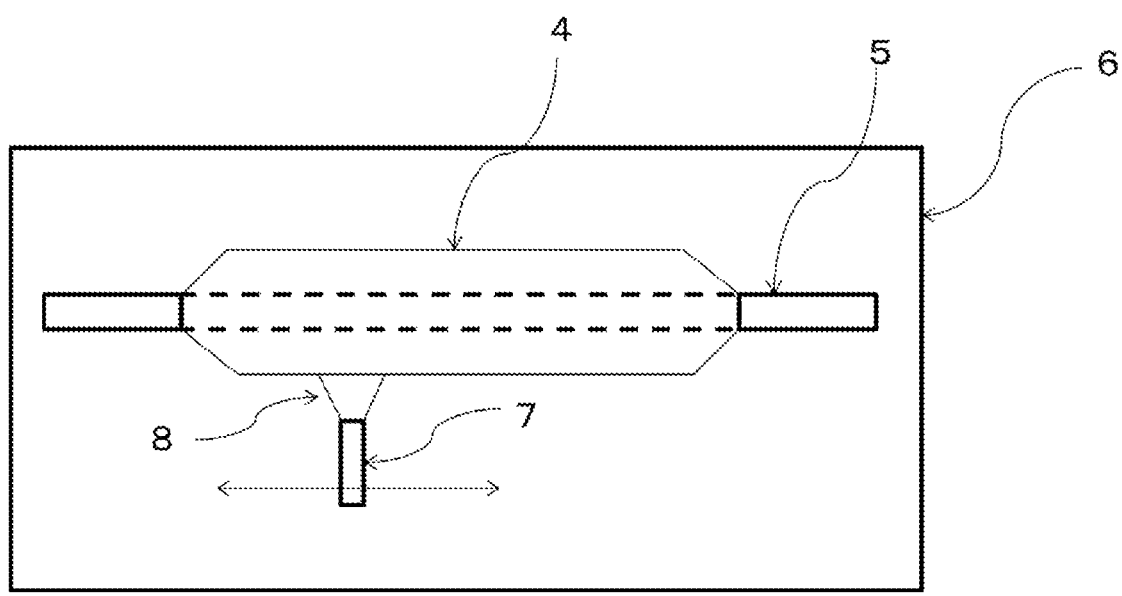
FIG. 4 is a schematic configuration view showing the manufacturing apparatus for a glass particulate deposit accompanied by movement of the burner.

FIG. 3 is a schematic configuration view showing a manufacturing apparatus for a glass particulate deposit accompanied by a change in angle of the burner. It is effective to mount the fixing jig of the present embodiment to a burner for clad deposition that is mainly used for deposition of a clad part. FIG. 4 is a schematic configuration view showing the manufacturing apparatus for a glass particulate deposit accompanied by movement of the burner. It is effective to mount the fixing jig of the present embodiment to a burner 7. In the present example, the manufacturing apparatus shown in FIG. 4 was used to deposit glass particulates, i.e., to manufacture a glass particulate deposit by an OVD method.

As the starting rod, a starting rod 5 obtained by welding quartz rods for dummy to both ends of a core member whose refractive index was adjusted for a single mode optical fiber having a diameter of 35 mm and a length of 1400 mm was used and set in a reaction vessel 6, and was then rotated at 40 rpm by a rotation mechanism core member rotating motor (not shown). Subsequently, a raw material gas $SICL_4$ of 45 g/min was supplied to the burner 7, together with an oxygen gas of 95 l/min as a flame formation gas, a hydrogen gas of 190 l/min, and an oxygen gas of 12 l/min as a carrier gas, from gas supply facilities (not shown). The burner 7 was reciprocally moved at a speed of 150 mm/min along the starting rod 5 within a range of 1800 mm by a burner traverse motor (not shown), and glass particulates 8 generated by the flame hydrolysis reaction of $SICL_4$ were deposited around the starting rod 5, so that a glass particulate deposit 4 having an outer diameter of 150 mm$\phi$ and a total weight of 30 kg was manufactured after 30 hours.

Comparative Example 1

In Comparative Example 1, when manufacturing the glass particulate deposit 4, the burner cover was directly put and fixed to the burner by an adhesive aluminum tape, without using the fixing jig for the burner cover. Herein, the burner was a glass multi-pipe burner having a straight body part having a length of 40 cm, and was provided at a root with branch pipes for causing an oxygen gas as a flame formation gas, a hydrogen gas, an oxygen gas as a carrier gas and $SICL_4$ as a raw material gas to flow. Also, the burner cover was a tubular glass having a straight body part having a length of 40 cm. At this time, a minimum value of the inner/outer diameter difference between the inner diameter of the burner cover and the outer diameter of the outermost pipe of the burner was 1.5 mm, and a protruding distance of the tip end of the burner cover from the tip end of the burner was 30 mm. Note that, also in following Examples, as the burner and the burner cover, the similar burner and burner cover were used. The inner diameter of the burner cover was measured every 5 cm in the length direction by using the inner diameter measuring instrument 141 series manufactured by Mitutoyo Corporation, the outer diameter of the outermost pipe of the burner was measured every 5 cm in the length direction by using the Vernier caliper 500 series manufactured by Mitutoyo Corporation, and the obtained values were used. Also in following Examples, the inner diameter and the outer diameter were measured in the similar manner.

Example 1

In Example 1, when manufacturing the glass particulate deposit 4, VALQUA Tape Seal (#20) (thickness: 0.15 mm, width: 20 mm, containing PTFE) was wrapped about 2 times on the outer periphery of the outermost pipe of the burner to mount a fixing jig having a thickness of 0.3 mm, the burner cover was inserted to the position of 10 mm of the fixing jig on the tip end-side of the burner, and the fixing jig was sandwiched and compressed between the burner cover and the outer periphery of the outermost pipe of the burner, so that the burner cover was attached to the burner via the fixing jig. At this time, a minimum value of the inner/outer diameter difference between the inner diameter of the burner cover and the outer diameter of the outermost pipe of the burner was 0.2 mm, and a protruding distance of the tip end of the burner cover from the tip end of the burner was 30 mm. Also, the outer diameter of a part of the fixing jig not compressed was greater than the inner diameter of the outermost pipe of the lower end of the burner cover.

Example 2

In Example 2, VALQUA Tape Seal (#20) (thickness: 0.15 mm, width: 20 mm, containing PTFE) was wrapped about 5 times on the outer periphery of the outermost pipe of the burner to mount a fixing jig having a thickness of 0.75 mm, and the burner cover was attached to the burner in the similar manner to Example 1. At this time, a minimum value of the inner/outer diameter difference between the inner diameter of the burner cover and the outer diameter of the outermost pipe of the burner was 0.5 mm, and a protruding distance of the tip end of the burner cover from the tip end of the burner was 30 mm. Also, the outer diameter of a part of the fixing jig not compressed was greater than the inner diameter of the outermost pipe of the lower end of the burner cover.

Example 3

In Example 3, VALQUA Tape Seal (#20) (thickness: 0.15 mm, width: 20 mm, containing PTFE) was wrapped about 10 times on the outer periphery of the outermost pipe of the burner to mount a fixing jig having a thickness of 1.5 mm, and the burner cover was attached to the burner in the similar manner to Example 1. At this time, a minimum value of the inner/outer diameter difference between the inner diameter of the burner cover and the outer diameter of the outermost pipe of the burner was 1.3 mm, and a protruding distance of the tip end of the burner cover from the tip end of the burner was 30 mm. Also, the outer diameter of a part of the fixing jig not compressed was greater than the inner diameter of the outermost pipe of the lower end of the burner cover.

Example 4

In Example 4, VALQUA Tape Seal (#20) (thickness: 0.15 mm, width: 20 mm, containing PTFE) was wrapped about 30 times on the outer periphery of the outermost pipe of the burner to mount a fixing jig having a thickness of 4.5 mm, and the burner cover was attached to the burner in the similar manner to Example 1. At this time, a minimum value of the inner/outer diameter difference between the inner diameter of the burner cover and the outer diameter of the outermost pipe of the burner was 4 mm, and a protruding distance of the tip end of the burner cover from the tip end of the burner was 30 mm. Also, the outer diameter of a part of the fixing jig not compressed was greater than the inner diameter of the outermost pipe of the lower end of the burner cover.

Example 5

In Example 5, VALQUA Tape Seal (#20) (thickness: 0.15 mm, width: 20 mm, containing PTFE) was wrapped about 33 times on the outer periphery of the outermost pipe of the burner to mount a fixing jig having a thickness of 5 mm, and the burner cover was attached to the burner via the fixing jig in the similar manner to Example 1. At this time, a minimum value of the inner/outer diameter difference between the inner diameter of the burner cover and the outer diameter of the outermost pipe of the burner was 4.7 mm, and a protruding distance of the tip end of the burner cover from the tip end of the burner was 30 mm. Also, the outer diameter of a part of the fixing jig not compressed was greater than the inner diameter of the outermost pipe of the lower end of the burner cover.

Example 6

In Example 6, VALQUA Tape Seal (#20) (thickness: 0.15 mm, width: 20 mm, containing PTFE) was wrapped about 10 times on the outer periphery of the outermost pipe of the burner to mount a fixing jig having a thickness of 1.5 mm, the burner cover was inserted to the position of 10 mm of the fixing jig on the tip end-side of the burner, and the fixing jig was sandwiched and compressed between the burner cover and the outer periphery of the outermost pipe of the burner, so that the burner cover was attached to the burner via the fixing jig. At this time, a minimum value of the inner/outer diameter difference between the inner diameter of the burner cover and the outer diameter of the outermost pipe of the burner was 1.3 mm, and a protruding distance of the tip end of the burner cover from the tip end of the burner was 15 mm. Also, the outer diameter of a part of the fixing jig not compressed was greater than the inner diameter of the outermost pipe of the lower end of the burner cover.

Example 7

In Example 7, the burner cover was attached to the burner via the fixing jig in the similar manner to Example 6, except that a protruding distance of the tip end of the burner cover from the tip end of the burner was 20 mm. Note that, a minimum value of the inner/outer diameter difference between the inner diameter of the burner cover and the outer diameter of the outermost pipe of the burner was 1.3 mm, and the outer diameter of a part of the fixing jig not compressed was greater than the inner diameter of the outermost pipe of the lower end of the burner cover.

Example 8

In Example 8, the burner cover was attached to the burner via the fixing jig in the similar manner to Example 6, except that a protruding distance of the tip end of the burner cover from the tip end of the burner was 40 mm. Note that, a minimum value of the inner/outer diameter difference between the inner diameter of the burner cover and the outer diameter of the outermost pipe of the burner was 1.3 mm, and the outer diameter of a part of the fixing jig not compressed was greater than the inner diameter of the outermost pipe of the lower end of the burner cover.

Example 9

In Example 9, the burner cover was attached to the burner via the fixing jig in the similar manner to Example 6, except that a protruding distance of the tip end of the burner cover from the tip end of the burner was 45 mm. Note that, a minimum value of the inner/outer diameter difference between the inner diameter of the burner cover and the outer diameter of the outermost pipe of the burner was 1.3 mm, and the outer diameter of a part of the fixing jig not compressed was greater than the inner diameter of the outermost pipe of the lower end of the burner cover.

Example 10

In Example 10, polyimide film (API-114A FR) (thickness: 0.06 mm, width: 25 mm, containing polyimide) was wrapped about 25 times on the outer periphery of the outermost pipe of the burner to mount a fixing jig having a thickness of 1.5 mm, the burner cover was inserted to the position of 10 mm of the fixing jig on the tip end-side of the burner, and the fixing jig was sandwiched and compressed between the burner cover and the outer periphery of the outermost pipe of the burner, so that the burner cover was attached to the burner via the fixing jig. At this time, a minimum value of the inner/outer diameter difference between the inner diameter of the burner cover and the outer diameter of the outermost pipe of the burner was 1.3 mm, and a protruding distance of the tip end of the burner cover from the tip end of the burner was 30 mm. Also, the outer diameter of a part of the fixing jig not compressed was greater than the inner diameter of the outermost pipe of the lower end of the burner cover.

Example 11

In Example 11, the burner cover was attached to the burner via the fixing jig in the similar manner to Example 10, except that the thickness of the fixing jig was made to be 1.5 mm by wrapping PFA film (AFA-113A) (thickness: 0.10 mm, width: 50 mm, containing PFA) about 15 times on the outer periphery of the outermost pipe of the burner. Note that, a minimum value of the inner/outer diameter difference between the inner diameter of the burner cover and the outer diameter of the outermost pipe of the burner was 1.3 mm, and a protruding distance of the tip end of the burner cover from the tip end of the burner was 30 mm. Also, the outer diameter of a part of the fixing jig not compressed was greater than the inner diameter of the outermost pipe of the lower end of the burner cover.

Example 12

In Example 12, the burner cover was attached to the burner via the fixing jig in the similar manner to Example 10, except that the thickness of the fixing jig was made to be 1.5 mm by wrapping polyethylene film (AUE-112B) (thickness: 0.18 mm, width: 25 mm, containing polyethylene) about 8 times. Note that, a minimum value of the inner/outer diameter difference between the inner diameter of the burner cover and the outer diameter of the outermost pipe of the burner was 1.3 mm, and a protruding distance of the tip end of the burner cover from the tip end of the burner was 30 mm. Also, the outer diameter of a part of the fixing jig not compressed was greater than the inner diameter of the outermost pipe of the lower end of the burner cover.

With the configurations of Comparative Example 1 and Examples 1 to 12, the production for a glass particulate deposit was each performed by 5 batches. Then, the variation in outer diameter of the glass particulate deposit, an amount of soot attachment to the tip end of the burner and breakage of the burner were inspected. The result is shown in Table 1.

TABLE 1

| | Fixing jig | Minimum value of inner/outer diameter difference (mm) | Protruding distance of cover (mm) | Variation in outer diameter of deposit | Amount of soot attachment to tip end of burner | Breakage of burner |
| --- | --- | --- | --- | --- | --- | --- |
| Comparative Example | Adhesive aluminum tape | 1.5 | 30 | large | large | Yes |
| Example 1 | VALQUA Tape Seal | 0.2 | 30 | small | small | Yes |
| Example 2 | VALQUA Tape Seal | 0.5 | 30 | small | small | No |
| Example 3 | VALQUA Tape Seal | 1.3 | 30 | small | small | No |
| Example 4 | VALQUA Tape Seal | 4 | 30 | small | small | No |
| Example 5 | VALQUA Tape Seal | 4.7 | 30 | large | small | No |
| Example 6 | VALQUA Tape Seal | 1.3 | 15 | large | large | No |
| Example 7 | VALQUA Tape Seal | 1.3 | 20 | small | small | No |
| Example 8 | VALQUA Tape Seal | 1.3 | 40 | small | small | No |
| Example 9 | VALQUA Tape Seal | 1.3 | 45 | large | small | No |
| Example 10 | Polyimide film | 1.3 | 30 | small | small | No |
| Example 11 | PFA film | 1.3 | 30 | small | small | No |
| Example 12 | Polyethylene film | 1.3 | 30 | small | small | Yes |

With the comparison of Examples 1, 2, 3, 4 and 5, it can be seen that the minimum value (mm) of the inner/outer diameter difference between the inner diameter of the burner cover and the outer diameter of the outermost pipe of the burner in a section orthogonal to the longitudinal direction of the burner at the time when the burner cover is fixed to the burner is preferably equal to or greater than 0.5 mm and equal to or smaller than 4 mm. When the numerical value is smaller than 0.5 mm, it is difficult to mount the burner cover to the burner, and the burner cover and the burner may be contacted to lead to breakage of the burner due to vibrations and the like during movement of the burner in the batch, which is not preferable. Also, when the numerical value exceeds 4 mm, it is difficult to mount the burner cover to the burner, and the flame generated from the burner is excessively spread, so that large unevenness occurs in a distribution of glass particulates in the flame and a diameter variation of the glass particulate deposit increases.

With the comparison of Examples 3, 6, 7, 8 and 9, it can be seen that the protruding distance of the tip end of the burner cover from the tip end of the burner is equal to or greater than 20 mm and equal to or smaller than 40 mm. When the numerical value is smaller than 20 mm, the effect of reducing the amount of soot attachment to the burner by the burner cover is lowered, so that the soot is attached to the burner itself, the flow of flame is suppressed and the diameter variation of the glass particulate deposit increases. Also, when the numerical value exceeds 40 mm, the flame generated from the burner is excessively narrowed, so that the temperature of the place, with which the flame collides, is locally excessively increased and the diameter variation of the glass particulate deposit increases.

With the comparison of Comparative Example and Examples 1, 10, 11 and 12, it can be seen that when the material of the fixing jig contains at least one of PTFE, PFA and polyimide, it is possible to suppress the breakage of the burner. The burner is broken when the fixing jig is deteriorated and thus the burner cover deviates from the burner and falls down, for example. When $SiCl_4$ is used as the raw material gas, the inside of the chamber has a hydrochloric acid atmosphere. Therefore, when the member having excellent heat resistance and chemical resistance is used as the fixing jig, it is possible to suppress the fixing jig from being deteriorated.

According to the present embodiment, a part of the fixing jig is sandwiched and compressed between the burner cover and the outermost pipe of the burner. Thereby, it is possible to easily mount the burner cover to a predetermined position of the burner even though the burner has a large individual difference in shape. When the fixing jig is configured by wrapping more than once the seal tape around the outermost pipe of the burner, it is possible to absorb the individual differences of the burner and the burner cover every easily and inexpensively, and to firmly mount the burner cover to a predetermined position, so that it is possible to prevent the burner cover from deviating and falling down during the manufacturing. Also, it is possible to easily perform replacement and attachment/detachment of the burner cover and fine adjustment of the individual burner, which can shorten the time required to perform the adjustment operation.

Note that, the present invention is not limited to the above-described embodiment, and can be appropriately modified and improved.

EXPLANATION OF REFERENCES

1: burner
2: burner cover
3: fixing jig
4: glass particulate deposit
5: starting rod
6: reaction vessel
7: burner
8: glass particulates
9: burner for clad deposition
10: burner cover

What is claimed is:

1. A manufacturing method for a glass particulate deposit comprising
    mounting a starting rod and a burner in a reaction vessel;
    mounting a fixing jig on an outer periphery of an outermost pipe of the burner;
    inserting a burner cover from a tip end of the outermost pipe of the burner; and
    sandwiching and compressing a part of the fixing jig between the burner cover and the outermost pipe of the burner to fix the burner cover to the burner;
    introducing a glass raw material to the burner;
    subjecting the glass raw material to a flame hydrolysis reaction to generate glass particulates in flame formed by the burner; and
    depositing the generated glass particulates on the starting rod to manufacture a glass particulate deposit
    wherein
    an outer diameter of a part of the fixing jig that is not compressed is greater than an inner diameter of a part of the burner cover inserted to the tip end of the outermost pipe of the burner;
    the burner is fixed to the burner cover mainly by outward forces resulting from the compressing; and
    the fixing jig has an abutting part formed where the part of the fixing jig that is compressed and the part of the fixing jig that is not compressed meet, the abutting part having an end face where the burner cover is in contact;
    wherein the material of the fixing jig includes at least one of PFA and polyimide to provide compressibility of the fixing jig for the compressing.

2. The manufacturing method for a glass particulate deposit according to claim 1, wherein
    the fixing jig contains PTFE.

3. The manufacturing method for a glass particulate deposit according to claim 1, wherein the fixing jig is configured by wrapping a tape or a film on the outer periphery of the outermost pipe of the burner.

4. The manufacturing method for a glass particulate deposit according to claim 1, wherein
    an inner/outer diameter difference between an inner diameter of the burner cover and an outer diameter of the outermost pipe of the burner in a section orthogonal to a longitudinal direction of the burner at the time when the burner cover is fixed to the burner is equal to or greater than 0.5 mm and equal to or smaller than 4 mm.

5. The manufacturing method for a glass particulate deposit according to claim 1, wherein
    a protruding distance of a tip end of the burner cover from a tip end of the burner is equal to or greater than 20 mm and equal to or smaller than 40 mm.

* * * * *